Patented Oct. 19, 1948

2,451,843

UNITED STATES PATENT OFFICE 2,451,843

MANUFACTURE OF FLUOROALKANES

Carl B. Linn and Louis Schmerling, Riverside, Ill., assignors to Universal Oil Products Company, Chicago, Ill., a corporation of Delaware No Drawing. Application May 31, 1946, Serial No. 673,608

4 Claims. (Cl. 260—653)

This invention relates to a method for producing highly branched fluoroalkanes.

An object of this invention is to produce a fluoro-dialkylalkane.

Another object of this invention is to produce a fluoro-dimethylbutane.

A further object of this invention is to produce 1-fluoro-3,3-dimethylbutane.

One specific embodiment of the present invention relates to a process for producing a 1-fluoro-3,3-dialkylalkane which comprises reacting ethylene and a member of the group consisting of a tertiary-olefin, a tertiary-alkanol, and a tertiary-alkyl fluoride in the presence of liquid hydrogen fluoride.

Another embodiment of the present invention relates to a process for producing 1-fluoro-3,3-dimethylbutane which comprises reacting ethylene and a member of the group consisting of isobutylene, tertiary-butyl alcohol, and tertiary-butyl fluoride in the presence of liquid hydrogen fluoride.

A further embodiment of the present invention relates to a process for producing 1-fluoro-3,3-dimethylbutane which comprises reacting ethylene and tertiary-butyl fluoride in the presence of liquid hydrogen fluoride at a temperature of from about —50° to about 100° C.

We have found that ethylene and isobutylene react under certain circumstances in the presence of hydrogen fluoride to yield a fluorohexane, 1-fluoro-3,3-dimethylbutane, which is a new composition of matter and an example of a new class of compounds, namely, the 1-fluoro-3,3-dialkylalkanes. Another example of these compounds is 1-fluoro-3,3-dimethylpentane which is produced by reacting ethylene and a tertiary-pentene with hydrogen fluoride. These substances being primary alkyl fluorides and having a neopentyl group attached to the carbon atom holding the fluorine atom are exceptionally stable. Unlike the alkyl fluorides formed by the addition of hydrogen fluoride to the double bond of propene and higher molecular weight olefins, these compounds are not affected by concentrated hydrogen fluoride, in which they are soluble. Being also miscible with hydrocarbons, these fluorides containing a neopentyl group have utility in processes requiring a common solvent for hydrogen fluoride and hydrocarbons.

The alkyl fluoride, 1-fluoro-3,3-dimethylbutane, is formed when ethylene, hydrogen fluoride and isobutylene or tertiary-butyl alcohol are contacted at a temperature of from about —50° to about 100° C. but preferably at temperatures of from about —10° to about 50° C.

1-fluoro-3,3-dimethylbutane is thus prepared using either batch or continuous types of operation by contacting isobutylene with substantially anhydrous hydrogen fluoride under ethylene pressures and at temperatures of from about —50° to about 100° C.; by contacting isobutylene with substantially anhydrous hydrogen fluoride at a temperature of from about —40° to about +20° C. and adding ethylene to the resultant reaction product at about —50° to about 100° C.; and by preparing tertiary-butyl fluoride by the reaction of tertiary-butyl alcohol or isobutylene with aqueous hydrogen fluoride and then reacting the resultant tertiary-butyl fluoride with ethylene at a temperature generally below about 50° C. and preferably below 0° C. in the presence of substantially anhydrous hydrogen fluoride.

The following example is given to illustrate the character of results obtained in the present process, although the data presented are not introduced with the intention of restricting unduly the generally broad scope of the invention.

A mixture of 41 grams of ethylene, 239 grams of isobutylene and 850 grams of isobutane was contacted with hydrogen fluoride of 98% concentration at 10° C. during a time of 5 hours. The volume ratio of hydrogen fluoride to hydrocarbon mixture was 0.16 in the reaction zone. From this reaction mixture was recovered 40 grams of hexyl fluoride and 469 grams of alkylate. The hexyl fluoride boiled at 75–77° C., had a refractive index of 1.3721 at 20° C. and a density, $d_4^{20}$ of 0.780. The alkylate contained 2% by volume of pentane, 5% of hexanes, 45% of octanes, 21% of nonanes, and a higher boiling residue.

Determinations of the carbon and hydrogen content and the molecular weight of hexyl fluoride gave the following results:

|  | Found | Calcd. for $C_6H_{13}F$ |
|---|---|---|
| Mol. Wt. | 101 | 104 |
| Percent C | 69.93 | 69.6 |
| Percent H | 11.11 | 12.59 |

This alkyl fluoride was shown to be 1-fluoro-3,3-dimethylbutane because upon hydrolysis (by heating with water and magnesium oxide at 225° C. for 4 hours in a sealed glass tube) it yielded 3,3-dimethylbutanol-1. The structure of the latter was proved by conversion to its 3,5-dinitrobenzoate derivative which melted at 83° C. This derivative was then converted to the α-naphthylamine addition compound which melted at 132° C.

The yield of fluorohexane is increased and the amount of by-product (such as alkylate) decreased by carrying out the reaction in the presence of a substantially inert diluent (such as a normal paraffin).

The nature of the present invention and the type of results obtained are evident from the preceding specification and example, although neither section is to be construed to limit unduly the broad scope of the invention.

We claim as our invention:

1. A process for producing 1-fluoro-3,3-dimethylbutane which comprises reacting ethylene, isobutylene and hydrogen fluoride at a temperature of from about −50° C. to about 100° C.

2. A process for producing 1-fluoro-3,3-dimethylbutane which comprises reacting ethylene, isobutylene and hydrogen fluoride at a temperature of from about −10° C. to about 50° C.

3. A process for producing 1-fluoro-3,3-dimethylbutane and a hydrocarbon alkylate which comprises reacting a mixture of ethylene, isobutylene and isobutane with hydrogen fluoride at a temperature of from about −50° C. to about 100° C.

4. A process for producing 1-fluoro-3,3-dimethylbutane and a hydrocarbon alkylate which comprises reacting a mixture of ethylene, isobutylene and isobutane with hydrogen fluoride at a temperature of from about −10° C. to about 50° C.

CARL B. LINN.
LOUIS SCHMERLING.

REFERENCES CITED

The following references are of record in the file of this patent:

UNITED STATES PATENTS

| Number | Name | Date |
|---|---|---|
| 2,181,640 | Deanesly et al. | Nov. 28, 1939 |
| 2,322,800 | Frey | June 27, 1943 |
| 2,399,512 | Schmerling | Apr. 30, 1946 |
| 2,409,090 | Woodward | Oct. 8, 1946 |
| 2,419,500 | Peterson et al. | Apr. 22, 1947 |

OTHER REFERENCES

"Chemical Abstracts," 21, 3887 (1927), abstracting article by Tronov et al., in Journal of the Physical and Chemistry Society of Russia, 58, 1270-7 (1926).

"Chemical Abstracts," 16, 3062 (1922), abstracting article by Swarts, in Bulletin de la Societe Chimique de Belgium, 30, 302-5 (1921).

Paterno et al.: "Gazzetta chimica italiana," 37, II, 310 (1907).

Delacre: Centr., 1906, I, 1233.

Schmerling: Jour. Am. Chem. Soc., vol. 67, 1152 (1945).

Simons: Ind. Eng. Chem., vol. 32, 178–183 (1940).

Gross et al.: Jour. Org. Chem., vol. III, 26–27 (1938).